Feb. 16, 1937.   R. H. STEARNS ET AL   2,070,813
MAGNETIC CLUTCH
Filed June 1, 1931    3 Sheets-Sheet 2
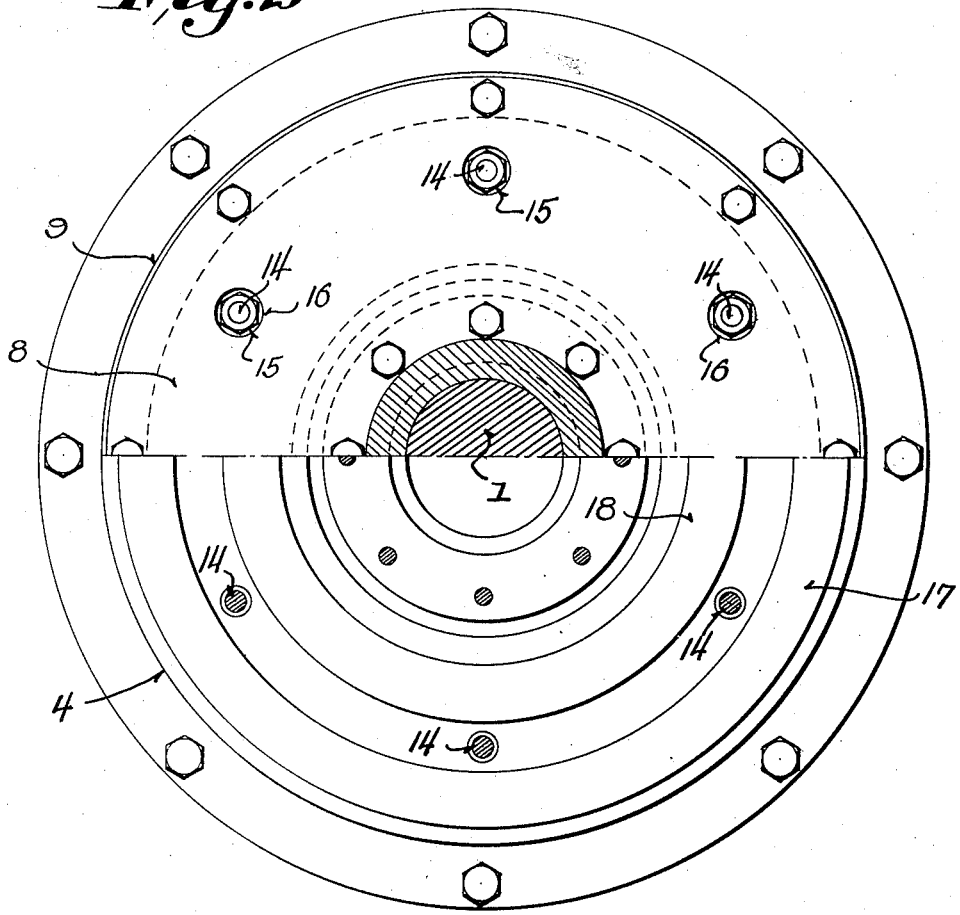
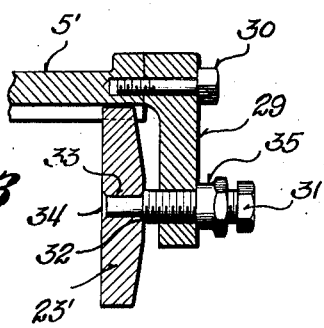
INVENTORS
Roswell H. Stearns
BY Harold W. Harman
Arthur R. Woolfolk
ATTORNEY

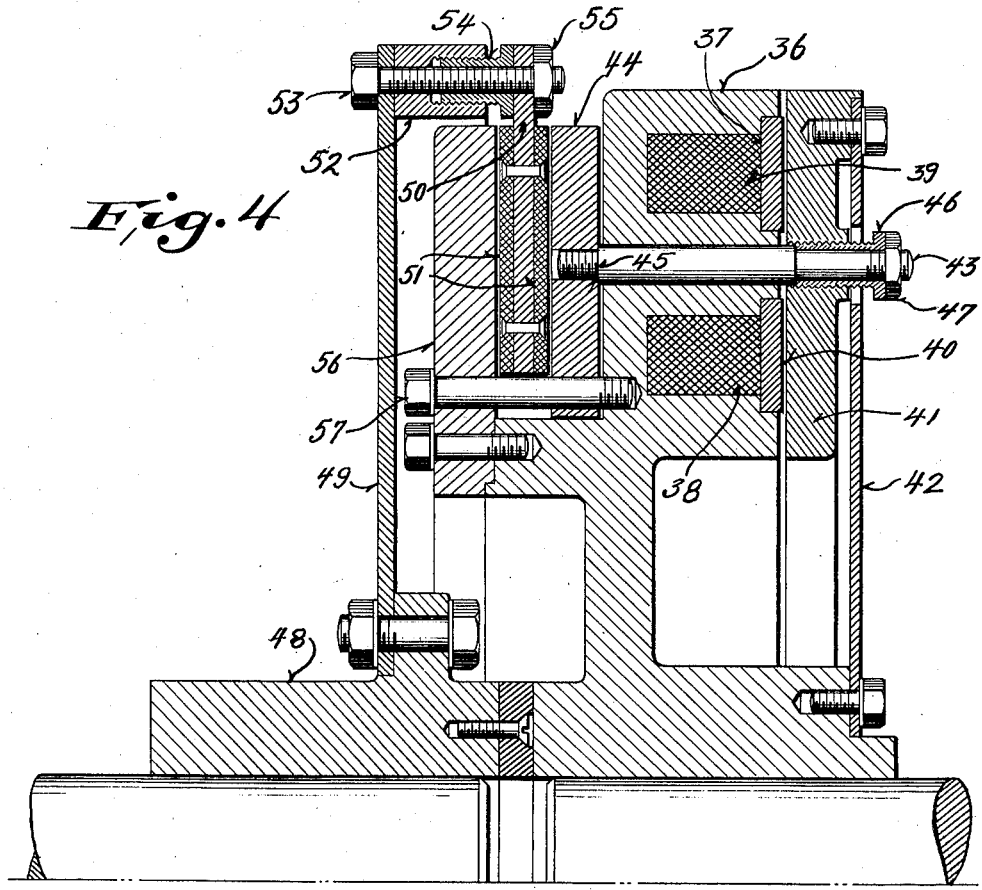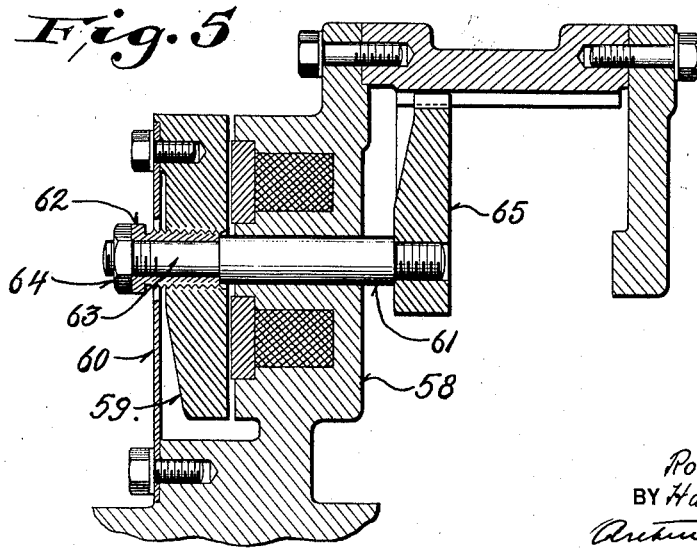

Patented Feb. 16, 1937

2,070,813

UNITED STATES PATENT OFFICE 2,070,813

MAGNETIC CLUTCH

Roswell H. Stearns, Milwaukee, and Harold W. Harman, Wauwatosa, Wis., assignors to Magnetic Manufacturing Company, Milwaukee, Wis.

Application June 1, 1931, Serial No. 541,202

17 Claims. (Cl. 192—84)

This invention relates to magnetic clutches. In magnetic clutches as heretofore constructed it has been the usual practice to provide a spring disk which transmitted the driving torque and which retracted the armature when the clutch was de-energized. Further, it has frequently happened in magnetic clutches that distortion of the armature occurred as no provision was made for balancing up the forces applied to the armature.

This invention is designed to overcome the above noted defects, and objects of this invention are to provide a magnetic clutch in which the spring disk does not transmit the driving torque, and in which provision is made for balancing the forces applied to the armature in such a manner that distortion of the armature cannot occur.

Further objects are to provide a magnetic clutch in which a pair of coils are employed for actuating the armature, such coils being carried in the magnet body or body portion of the clutch and being protected by non-magnetic rings which not only afford the requisite protection for the coils or energizing windings, but also prevent "freezing" or contacting of the armature with the magnet body or body portion even when extreme wear of the clutch parts occur.

Further objects are to provide a magnetic clutch in which multiple driving rings or friction rings are provided, in which there is no backlash, but instead in which the friction rings are slidably held to their respective driving and driven parts of the clutch by a gear tooth construction having the usual gear clearance and providing a vast number of points of attachment through which the driving force from the driven to the driving parts of the clutch may be transmitted without excessive stresses at any portion, but instead insuring a uniform distribution of the stresses throughout the entire series of friction disks and uniformly around such friction disks.

Further objects are to provide a magnetic clutch in which an armature is merely retracted by a spring disk, in which pressure rods or actuating rods pass between the energizing coils from approximately the central portion of the armature with respect to the magnetic attractive forces, in which these actuating rods transmit the pressure from the armature to the friction disks, and in addition afford a secure mechanical support for the armature and for the compression ring to which these rods are attached. In addition to this, the compression ring is also supported by its external gear teeth which mesh with the internal gear teeth of the clutch body or driving portion.

Further objects are to provide a magnetic clutch which is equipped with a back ring against which the last friction disk bears, and which is also equipped with means for adjusting the back ring to take up wear in a uniform manner, so that the back ring may be correctly positioned under all stages of wear, and in one form of the invention a specific object is to provide a bearing ring which is screw-threaded into the body portion of the magnetic clutch and may be adjusted by merely rotating the anvil ring to secure the precise adjustment of the back ring desired, and which may be readily locked in any suitable manner, such anvil ring eliminating the necessity for adjusting screws.

Further objects are to provide a magnetic clutch in which the internal and external gear teeth of the two main portions of the clutch may be formed by cutting straight across the respective portions without encountering shoulders, flanges, or other parts, but which instead may be formed with the utmost ease, in which the gear teeth on the friction rings may be formed with the utmost ease, and in which the assembling of the friction rings in meshed relation with the gear teeth carried by the main body portions of the clutch is accomplished in a very simple manner.

Further objects are to provide a multiple disk magnetic clutch which is so constructed that the anvil ring may be readily removed, thus permitting the removal of the back ring and of the friction rings so that the friction rings may be easily inspected, relined, or repaired as desired, such friction rings being preferably formed alternating of the lined and unlined type. Either type, of course, may be either solid or split as desired.

Embodiments of the invention are shown in the accompanying drawings, in which:—

Figure 2 is a sectional view on the line 2—2 of Figure 1.

Figure 3 is a sectional detail of a modified form of the invention.

Figure 4 is a further form of the invention showing one-half of the clutch in section.

Figure 5 is a fragmentary detail of a still further form of the invention.

Figure 1:
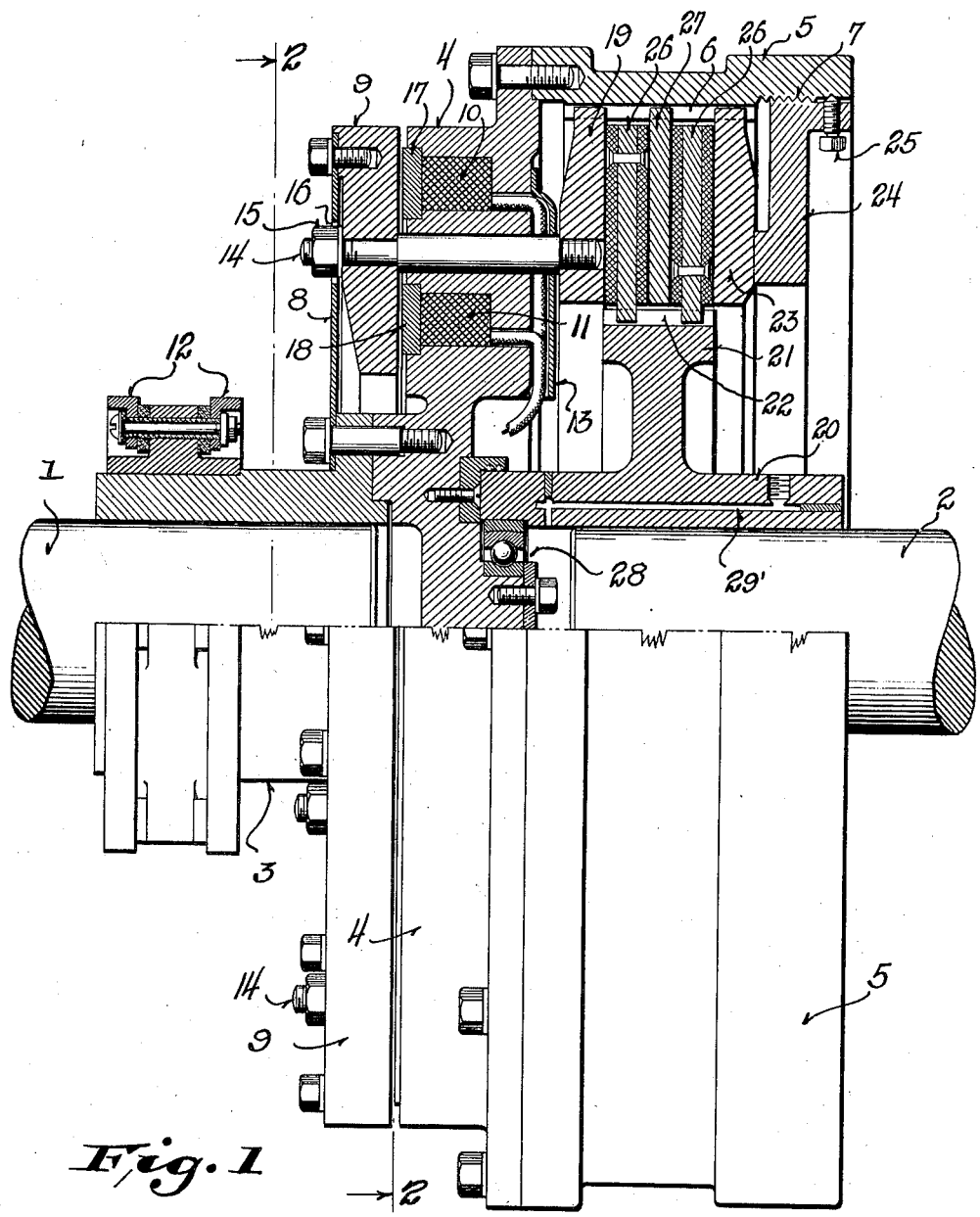
Figure 1 is a side elevation, partly in section, of the magnetic clutch.

Referring to the drawings, particularly Figure 1, it will be seen that the driving and driven shafts are indicated by the reference characters 1 and 2 respectively. The driving shaft rigidly carries a hub 3 which is bolted to the magnet body or body portion of the clutch 4. This body portion also includes an annular sleeve-like member 5 which projects rearwardly, and which is provided with gear teeth 6 continuously around its internal periphery, the inner rear portion of such member 5 being provided with an internally threaded portion 7. The hub 3 carries a spring disk 8 which is bolted thereto. An armature 9 is bolted to the outer marginal portion of the spring disk 8, such spring disk serving merely to retract the armature and acting in no manner to transmit the driving torque.

The body portion 4 is provided with two annular recesses within which magnet windings or energizing windings 10 and 11 are provided, such windings being connected to collector rings 12 in any suitable manner. It is preferable to provide a protecting housing 13 for the conduits or cables leading from the magnet windings.

A plurality of pressure rods or actuating rods 14 extend through the body portion between the energizing coils or magnet coils 10 and 11, such pressure rods being symmetrically positioned around the body portion. These pressure rods are shouldered and screw-threaded at opposite ends. The shouldered portion at the forward end of the rod bears directly against the armature 9, as shown in Figure 1, and is locked to such armature by means of the nut 15, such nut in each instance passing freely through a corresponding aperture 16 formed in the retracting spring disk 8.

Attention is directed to the fact that the armature 9 and body portion 4 are formed of magnetic material and that protecting rings 17 and 18 are provided for the magnet coils 10 and 11 respectively. These protecting rings are held in place in any suitable manner, and project outwardly beyond the face of the body portion 4 so that there is no chance of the armature 9 contacting with the body portion and freezing thereto, even if excessive wear in the friction rings hereinafter described should occur.

The inner end of the actuating rods or pressure rods 14 are shouldered, as stated, and are screw-threaded into a wear or compression ring 19 with the rear shoulder of the pressure rod 14 abutting such compression ring.

The driven portion of the clutch consists of a hub 20 which is rigidly attached to the driven shaft 2, and which is provided with a drum 21. This drum is equipped with external gear teeth 22, as shown in Figure 1, which extend completely around the face of the drum.

A back ring 23 is provided and bears against a bearing ring 24. This bearing ring is provided with external screw threads which cooperate with the threaded portion 7 of the body portion of the clutch. It is adjustable by rotating it with reference to the body portion and may be held in adjusted position in any suitable manner, for example, by means of one or more set screws 25.

A plurality of friction disks are positioned between the compression ring 19 and the back ring 23. Preferably the internal friction rings 26 are lined with molded asbestos, or other suitable material, whereas the external friction ring 27 is preferably unlined. This construction is merely given as an example of the manner of facing the respective rings and is not intended as limiting. The external friction ring 27 is provided with external gear teeth which mesh with the gear teeth 6 uniformly completely around the ring. The internal friction rings 26 are provided with internal gear teeth which mesh with the gear teeth 22 of the driven portion of the clutch completely around such driven portion. The construction is such that these gear teeth freely slide for relative adjustment of the friction rings in operation of the clutch and serve to transmit the driving torque without any backlash of the various parts. Also the construction is such that a uniform distribution of pressure is secured.

When the clutch is operated, the pull from the magnet body or body portion is uniform with respect to the armature 9 and the force from the armature is transmitted to the actuating rods 14 from approximately the center of the armature ring so that distortion of the armature cannot occur. This force is transmitted to the compression ring 19 and comprises the friction rings between such compression ring and the back ring 23.

As wear occurs, it is a simple matter to release the set screw or set screws 25 and rotate the bearing ring 24 slightly to take up for wear and thereafter again lock the bearing ring in place by means of the set screw or set screws 25. The adjustment of the bearing ring 24 uniformly adjusts the back ring 23 all the way around such back ring so that there is no chance of undesirable angular setting of the back ring with respect to the axis of the clutch. Consequently, uniform frictional engagement of the friction rings is secured throughout the entire active life thereof.

If for any reason excessive wear should occur, the armature will not stick or freeze to the magnet body or body portion of the clutch, as it is prevented from contact therewith by the protecting rings 17 and 18. However, this is not the normal operation of the clutch, but is merely a provision to take care of an emergency condition or unusual condition. It will be seen that the clutch cannot become damaged even when excessive wear occurs.

It is a simple matter to renew or inspect or repair the friction rings. Under these conditions, the anvil ring is unscrewed, and the back ring 23 and the friction rings are slid rearwardly so that they may be freely inspected or repaired, as desired. Obviously the lined friction rings may be split in accordance with the usual practice if so desired, or they may be continuous rings.

It is to be understood that any of the usual practices may be followed for other portions of the clutch than those described. For instance, a pilot bearing indicated generally at 28 may be employed to assist in holding the ends of the driving and driven shafts in alignment, and obviously such bearing may be oiled through suitable ducts, such as indicated by the reference character 29'.

It is within the province of this invention to provide other means for adjusting the back ring than that previously described. For example, in the modified form shown in Figure 3, the body portion 5' is provided with a ring 29 preferably bolted thereto, as indicated at 30, and provided with a plurality of regularly spaced threaded apertures through which set screws or adjusting screws 31 may pass, one of which is shown in the sectional detail Figure 3. Each adjusting screw 31 is provided with a shoulder portion 32 and with a reduced portion 33, which is freely received by the back ring 23'. It is preferable to provide a slightly enlarged end 34 on the reduced portion 33 which seats loosely within a correspondingly recessed portion of the back ring 23, thereby providing a swiveled connection between the adjusting screws and the back ring 23'.

Each adjusting screw 31 is provided with a lock nut 35 so that after adjustment has taken place, it may be rigidly locked in its adjusted position.

It will be seen that a novel form of multiple disk magnetic clutch has been provided by this invention, in which no distortion of the armature can occur, in which the spring disk serves merely as a retracting member for the armature, in which a plurality of energizing or magnet coils are provided, and in which the multiple disks are pressed into frictional engagement with each other through the medium of pressure rods or actuating rods symmetrically positioned with respect to the forces acting upon the armature.

It will be seen also that means have been provided by this invention for accurately and uniformly adjusting the friction rings to compensate for wear, and it will be seen further that the friction rings are readily removable for inspection or repair.

Referring to Figure 4, it will be seen that what may be called a duplex magnetic clutch has been illustrated as two friction surfaces are provided for the external friction ring.

In this form of the invention the magnet body 36 is constructed as previously described and may have a pair of energizing windings 38 and 39 which are protected by non-magnetic rings 37 and 40. The armature 41 is supported by a spring disk 42, as indicated in Figure 4, and this spring disk is cut out to allow the actuating or pressure rods 43 to pass freely therethrough. These pressure rods slide freely through the magnet body and are shouldered and threaded at their forward ends and screwed into the wear ring or compression ring 44, the shoulder 45 abutting the rear surface of the compression ring.

The rear ends of the actuating rods or pressure rods 43 are reduced and revolubly carry a threaded adjusting sleeve or nut 46. The extreme ends of these reduced sections of the actuating rods 43 are threaded and carry lock nuts 47. This construction provides a fine adjustment which may very readily be made by loosening the lock nuts 47 and rotating the nuts or sleeves 46, which are threaded into the armature 41. Thereafter the lock nuts are again tightened. This adjustment moves the compression ring 44 inwardly or outwardly with respect to the armature 41 to take up for wear or for any other adjustment of this type that may be needed.

The collector rings have not been shown in Figure 4, but may be of any form, such as shown, for instance, in Figure 1.

It is preferable to have the magnet body 36 the driving member and to provide a relatively lighter driven member 48, although obviously this arrangement may be reversed and the member 48 may be the driving member.

The member 48 is a hub which carries a spring disk 49. This spring disk supports the friction ring 50 which is preferably lined on opposite sides with a friction surface material, such as molded asbestos, for instance, as indicated by the reference character 51. The friction ring 50 is suspended from the periphery of the spring disk 49, as clearly shown in Figure 4, and the construction employed may comprise spacers 52 through which bolts 53 pass. This spacer is recessed and internally threaded and receives the externally threaded adjusting nut 54. The threaded bolt 53 projects freely through this nut 54 and receives the lock nut 55 which locks the parts in their adjusted position.

In this construction an outer bearing ring 56 is bolted to the magnet body and operates in the manner of the back ring 23, see Figure 1, previously described. It is also preferable to provide bolts 57 which pass through the back ring 56 and which pass freely through the compression ring 44 and are threaded into the magnet body.

It is clear that the compression ring 44 may be adjusted by means of the nuts 46 and 47 to compensate for wear, and it is also obvious that the position of the friction ring 50 may be readily adjusted by means of the nuts 54 and 55.

In this form of the invention it is not necessary to provide intermeshing teeth between the magnet body and the ring 44, as the bolts 57 afford the requisite sliding connection between such parts and thus relieve the pressure or actuating rods 43 of any binding action.

In the form shown in Figure 5, a construction very similar to that shown in Figure 1 is indicated. In order to simplify the drawings the internal and external friction rings have been omitted. This construction provides a magnet body 58 and an armature 59, which are very similar to the construction of Figure 1. The armature 59 is carried by a spring disk 60, and is connected to the actuating or pressure rods 61 by an adjustable mechanism consisting of an externally threaded nut 62 loosely carried by a reduced portion 63 of the rod 61 and threaded into the armature 59. This sleeve or nut 62 bears against a shouldered portion of the rod 61. A lock nut 64 is provided for locking the nut 62 in its adjusted position. The other end of the rod 61 is reduced and threaded and screws into the compression ring 65, similar to the compression ring 19 previously described.

In this last form of the invention, the adjustment to compensate for wear is made by means of the nut 62, such nut being thereafter locked in place by means of the nut 64.

It is to be distinctly understood that although the specific adjustments have been shown for different forms of the invention, that nevertheless any form of adjustment shown may be employed in any of the forms of the invention.

It will be seen that a novel form of magnetic clutch has been provided by this invention which is eminently practical, which is reliable in operation, which is easy to produce, which is easy to maintain in adjustment, and in which the repair thereof may be made with the utmost ease.

Although this invention has been described in considerable detail, it is to be understood that such description is intended as illustrative rather than limiting, as the invention may be variously embodied and is to be interpreted as claimed.

We claim:

1. A magnetic clutch comprising a driving member having a body portion, a driven member, a plurality of friction rings carried alternately by said members, a compression ring carried by said driving member, a pair of annular energizing coils carried by said driving member, a plurality of rods slidably positioned between said coils and carried by said driving member and adapted to force said friction rings into frictional engagement with each other, and an armature connected to said rods and adapted to be drawn towards said driving member when said coils are energized.

2. A magnetic clutch comprising a driving member having a body portion, a driven member, a plurality of friction rings carried alternately by said members, a compression ring carried by said driving member, a pair of annular energizing coils carried by said driving member, a plurality of rods slidably positioned between said coils and carried by said driving member and adapted to force said friction rings into frictional engagement with each other, and an armature connected to said rods and adapted to be drawn towards said driving member when said coils are energized, said rods being connected to said armature approximately centrally of the forces acting upon said armature when said coils are energized.

3. A magnetic clutch comprising a driving member having a body portion provided with two annular recesses, a pair of annular energizing windings positioned within said recesses, an armature positioned adjacent said body portion and adapted to be drawn towards said body portion when said windings are energized, said armature comprising an annular ring, a plurality of rods slidably passing through said body portion between said energizing windings and attached to said armature between its inner and outer peripheries, a compression ring attached to said rods and driving member, and a plurality of friction rings carried alternately by said driving and driven members, said friction rings being forced into frictional engagement with each other by said compression ring when said armature is drawn towards said driving member.

4. A magnetic clutch comprising a driving member having internal gear teeth, a driven member having external gear teeth, a plurality of friction rings alternately provided with external and internal gear teeth meshing with said internal and external gear teeth, said driving member having a pair of annularly arranged energizing windings, a movable armature centrally supported between and actuated by said energizing windings and adapted to force said friction rings into frictional engagement with each other, and an annular flexible steel plate for retracting said armature.

5. A magnetic clutch comprising a driving and a driven member, one of said members having a friction ring, the other of said members having a compression ring adapted to engage said friction ring, electromagnetic means including an armature for moving said compression ring, rods operatively joining said armature and said compression ring, externally threaded sleeves carried by said rods and threaded into said armature for adjusting the position of said rods to compensate for wear, and lock nuts carried by said rods for locking said sleeves in adjusted position.

6. A magnetic clutch comprising a body portion having a magnet winding therein, an armature positioned adjacent said body portion, interengaging friction means, a compression ring for compressing said friction means, rods rigidly carried by said compression ring and projecting through said body portion and having a reduced, threaded outer portion, externally threaded sleeves surrounding said reduced portion of said rods and threaded into said armature, and lock nuts for locking said sleeves in adjusted position.

7. A magnetic clutch comprising a body portion, energizing windings carried by said body portion, an armature positioned in proximity to said body portion, actuating rods slidably carried by said body portion and projecting through said armature, said rods having a reduced portion adjacent said armature, a sleeve revolubly carried by said reduced portion and threaded into said armature, locking means for locking said sleeve to said reduced portion, said body portion having a rearwardly projecting cylindrical portion, friction means enclosed within said cylindrical portion, and a compression ring positioned within said cylindrical portion and rigidly attached to said rods.

8. A magnetic clutch comprising a driving and a driven member, one of said members having a body portion provided with an energizing winding, an armature positioned in proximity to said body portion, a spring disk supporting said armature, a rear ring carried by said body portion, a compression ring spaced from said rear ring, a plurality of actuating rods slidably carried by said body portion and rigidly attached to said compression ring, an adjustable threaded sleeve surrounding each of said rods and threaded into said armature for adjusting the position of said rods, means for locking said sleeve in place, a friction ring positioned between said rear ring and said compression ring, a spring disk for supporting said friction ring, and adjustable means for adjusting the said friction ring with respect to said last mentioned spring disk.

9. A magnetic clutch comprising a driving and a driven member, cooperating friction means carried by said driving and driven member, one of said members having a body portion of magnetic material provided with a plurality of annular energizing windings concentric with the axis of said clutch, a movable armature centrally supported between said windings by said last mentioned member, and means operated by said armature for compressing said friction means.

10. A magnetic clutch comprising a driving and a driven member, cooperating friction means carried by said driving and driven member, one of said members having a body portion of magnetic material provided wtih a plurality of annular energizing windings embedded therein, a movable armature centrally supported between said windings by said last mentioned member, and rods operated by said armature for compressing said friction means.

11. A magnetic clutch comprising a driving and a driven member, cooperating friction means carried by said driving and driven member, one of said members having a body portion of magnetic material provided with a plurality of annular energizing windings embedded therein, a movable armature centrally supported between said windings by said last mentioned member, and rods operated by said armature for compressing said friction means, said rods being slidably carried by said last mentioned member.

12. A magnetic clutch comprising a driving and a driven member, a plurality of cooperating friction rings carried by said members and adapted to be forced into engagement with each other to transmit driven torque from said driving to said driven members, one of said members having a plurality of annular channels formed therein, a plurality of annular energizing windings positioned within said annular channels, an armature centrally supported between said windings by said last mentioned member and adapted to be moved towards said last mentioned member when said windings are energized, said armature being spaced from said friction rings, and means for transmitting the force of said armature to said friction rings.

13. A multiple disk magnetic clutch comprising a driving member having a cylindrical portion provided with internally extending projections, a friction ring slidably carried by said projections, a driven member provided with external projections, a friction ring slidably carried by said external projections, a bearing ring carried by said driving member and adjustably mounted thereon for taking up wear between said friction rings in combination with a magnet body having a plurality of annular energizing windings and an armature member having push rods centrally located between the energizing windings in said magnet body for forcing said friction rings into binding engagement with each other.

14. A magnetic clutch comprising a driving and a driven member, one of said members having a body portion and a rearwardly projecting cylindrical portion, friction rings positioned within said rearwardly projecting cylindrical portion and carried alternately by said driving and driven members, a rear ring against which the rearmost of said friction rings is adapted to bear, means for moving said rear ring forwardly in a simultaneous and uniform manner to any fractional degree on the arc of a circle throughout its extent to compensate for wear, a compression ring positioned forwardly of said friction rings in combination with a magnet body having a plurality of annular energizing windings and an armature member having push rods centrally located between the energizing windings in said magnet body for forcing said compression ring towards said rear ring to cause said friction rings to frictionally engage each other, whereby driving torque is transmitted from said driving to said driven member.

15. A magnetic clutch comprising a driving and a driven member, one of said members having a body portion and a rearwardly projecting cylindrical portion, friction rings positioned within and surrounded by said rearwardly projecting cylindrical portion and carried alternately by said driving and driven members, a rear ring against which the rearmost of said friction rings is adapted to bear, an adjusting ring having threaded engagement with said rearwardly projecting cylindrical portion and adapted to be rotated to any fractional degree on the arc of a circle, to move said rear ring forwardly in a uniform manner throughout its extent to compensate for wear, a compression ring positioned forwardly of said friction rings in combination with a magnet body having a plurality of annular energizing windings and an armature member having push rods centrally located between the energizing windings in said magnet body for forcing said compression ring toward said gear ring to cause said friction rings to frictionally engage each other, whereby driving torque is transmitted from said driving to said driven member.

16. In a magnetic clutch the combination of a plurality of interengaging friction means, electromagnetic means for causing said friction means to interengage, said electromagnetic means comprising in combination a magnet body and an armature centrally supported, having opposed faces and a visible, adjustable air-gap, a nonmagnetic means to prevent the faces of said members contacting each other when magnetically energized, a rear ring against which said friction means is compressed, threaded screws revolubly carried by said rear ring for adjusting the position of said rear ring to any fractional degree, and means for locking said threaded screws in place.

17. A magnetic clutch comprising a driving and a driven member, one of said members having a rear ring and a compression ring, the other of said members having adjustable friction rings flexibly mounted between said first mentioned rings, an electromagnetic body portion and annular energizing windings embedded within said body portion, an armature member flexibly supported in juxtaposition to said body portion, actuating rods carried by said armature, said rods being centrally located in the magnet body portion between said energizing windings and connected to said compression ring, and means adjustably connecting said actuating rods and said armature to compensate for wear.

ROSWELL H. STEARNS.
HAROLD W. HARMAN.